United States Patent
Honjo et al.

(10) Patent No.: US 7,235,220 B2
(45) Date of Patent: Jun. 26, 2007

(54) EXHAUST GAS TREATMENT METHOD, EXHAUST GAS TREATMENT SYSTEM, AND CATALYTIC OXIDATION APPARATUS

(75) Inventors: Shintaro Honjo, Hiroshima-ken (JP); Kozo Iida, Hiroshima-ken (JP); Kenichi Okada, Hiroshima-ken (JP); Yasuhiro Takeuchi, Hiroshima-ken (JP); Masanori Tabata, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 717 days.

(21) Appl. No.: 10/733,374

(22) Filed: Dec. 12, 2003

(65) Prior Publication Data

US 2005/0112042 A1    May 26, 2005

(30) Foreign Application Priority Data

May 16, 2003   (JP) .............................. 2003-139212

(51) Int. Cl.
*B01D 53/64* (2006.01)
*B01J 38/00* (2006.01)
(52) U.S. Cl. ........................... 423/210; 502/20; 502/34
(58) Field of Classification Search ................ 423/210; 502/20, 34
See application file for complete search history.

(56) References Cited

U.S. PATENT DOCUMENTS

| | | | |
|---|---|---|---|
| 5,607,496 A * | 3/1997 | Brooks ........................ | 75/670 |
| 6,638,485 B1 | 10/2003 | Iida et al. | |
| 6,960,329 B2 * | 11/2005 | Sellakumar ................. | 423/210 |
| 2003/0170159 A1 | 9/2003 | Honjo et al. | |
| 2004/0202596 A1 * | 10/2004 | Honjo et al. ................ | 423/210 |
| 2006/0159605 A1 * | 7/2006 | Seames et al. ................ | 423/99 |

FOREIGN PATENT DOCUMENTS

| | | |
|---|---|---|
| EP | 0 527 457 A1 * | 2/1993 |
| JP | 10-230137 A | 9/1998 |
| JP | 2003-053142 A | 2/2003 |

* cited by examiner

*Primary Examiner*—Timothy C. Vanoy
(74) *Attorney, Agent, or Firm*—Birch, Stewart, Kolasch & Birch, LLP

(57) ABSTRACT

The present invention provides an exhaust gas treatment method including oxidation treatment for converting metallic mercury contained in combustion exhaust gas into mercury chloride; and mercury removal treatment for removing mercury from the combustion exhaust gas by dissolving the mercury chloride in water, wherein a plurality of oxidation catalysts for performing the oxidation treatment are provided, and during the time when the oxidation treatment is performed, at least one of the oxidation catalysts performs catalyst performance restoration treatment without performing oxidation treatment. According to the present invention, the deterioration in mercury removal performance can be restrained even in continuous operation on condition that mercury is oxidized in a low temperature region not higher than 300° C.

3 Claims, 12 Drawing Sheets

EXHAUST GAS TREATMENT METHOD, EXHAUST GAS TREATMENT SYSTEM, AND CATALYTIC OXIDATION APPARATUS

This Nonprovisional application claims priority under 35 U.S.C. § 119(a) on Patent Application No(s). 2003-139212 filed in JAPAN on May 16, 2003, the entire contents of which are hereby incorporated by reference.

FIELD OF THE INVENTION

The present invention relates to an exhaust gas treatment method and an exhaust gas treatment system, which can remove mercury contained in exhaust gas, especially exhaust gas generated by burning coal or heavy oil as a fuel.

BACKGROUND OF THE INVENTION

A conventional exhaust gas treatment system will be described with reference to FIG. 12.

Combustion exhaust gas sent from a boiler 111 is introduced into a denitrification apparatus 114. In a flow path to the denitrification apparatus 114, an ammonia injection apparatus 112 is provided to inject $NH_3$, which is supplied from an ammonia tank 113, into the exhaust gas. For the exhaust gas into which $NH_3$ is injected, $NO_x$ is converted into nitrogen in the denitrification apparatus 114 by selective reduction reactions expressed in Equations (1) and (2), by which denitrification is accomplished.

$$4NO+4NH_3+O_2 \rightarrow 4N_2+6H_2O \quad (1)$$

$$NO+NO_2+2NH_3 \rightarrow 2N_2+3H_2O \quad (2)$$

The desulfurized exhaust gas passes through an air heater 116 and a heat exchanger 117, and flows into an electrical dust collector 118, where soot and dust are removed. Thereafter, $SO_2$ is removed in a wet type desulfurization apparatus 119. The coal or heavy oil burning exhaust gas contains hazardous trace substances such as mercury. Among these substances, mercury is generally difficult to remove. It is thought that mercury exists in exhaust gas mainly as metallic mercury (Hg) or mercury chloride ($Hg_2Cl_2$ or $HgCl_2$). In the case where mercury exists in a form of $Hg_2Cl_2$ or $HgCl_2$ in this treating process, mercury is removed by the wet type desulfurization apparatus 119 because $Hg_2Cl_2$ or $HgCl_2$ in the exhaust gas is dissolved in water by gas-liquid contact in the desulfurization apparatus 119. However, in the case where mercury exists in a form of metallic mercury, the removal rate of mercury is low, and mercury is discharged from a stack 121 through a heat exchanger 120 without being removed because metallic mercury is difficult to dissolve in water. In the heat exchanger 120, the combustion exhaust gas whose temperature has been decreased is heated by thermal energy recovered by the heat exchanger 117 at the preceding stage of the wet type desulfurization apparatus 119.

To solve the above problem, the inventors of the present invention found that metallic mercury in exhaust gas can be converted into $HgCl_2$ on a denitrification catalyst by a reaction expressed by Equation (3) in the presence of HCl. As the result, in Japanese Patent Provisional Publication No. 10-230137 (No. 230137/1998), the applicant has proposed a method in which on the upstream side of the denitrification apparatus 114, metallic mercury is converted into a chlorine compound having high water solubility on a denitrification catalyst by adding a mercury chlorinating agent such as HCl to exhaust gas containing mercury, by which mercury is removed with high efficiency by the wet type desulfurization apparatus 119 provided on the downstream side of the denitrification apparatus 114.

$$Hg+HCl+½O_2 \rightarrow HgCl_2+H_2O \quad (3)$$

In this method, however, since the service temperature of the denitrification apparatus 114 is limited to 300 to 450° C., for a fuel having a low Cl content, it is necessary to add excess chlorinating agent (HCl etc.) suso that mercury chloride is stabilized. However, the addition of chlorinating agent more than needed causes corrosion of gas flues and downstream-side apparatuses in the system, and finally may shorten the life of the plant facility.

Thereupon, the applicant of the present invention has proposed, in Japanese Patent Provisional Publication No. 2003-53142, an exhaust gas treatment method and an exhaust gas treatment system, in which after metallic mercury is oxidized into mercury chloride at a reaction temperature not higher than 300° C. by a solid catalyst, mercury is removed by an alkali absorbing solution, by which even for a fuel having a low Cl content, metallic mercury can be oxidized stably into mercury chloride without the addition of a chlorinating agent (HCl etc.).

FIG. 13 shows a configuration of an exhaust gas treatment system disclosed in Japanese Patent Provisional Publication No. 2003-53142.

In the exhaust gas treatment system shown in FIG. 13, on the downstream side of a boiler 231, a denitrification apparatus 232, an air heater 233, a dust collector 234, a heat exchanger 235 for recovering thermal energy, a catalytic oxidation apparatus 236, a wet type desulfurization apparatus 237, a reheater 238, and a stack 239 are arranged in succession. Also, this exhaust gas treatment system has a temperature controller 240 to which a gas temperature at an inlet a of the catalytic oxidation apparatus 236 and a Hg concentration at an outlet b thereof are sent as signals, and a heat medium flow rate regulating valve 241 to which a flow rate regulation signal is sent from the temperature controller 240.

The exhaust gas treatment system shown in FIG. 13 is configured so that the gas temperature of the catalytic oxidation apparatus 236 is controlled so as to be an optimum temperature by regulating the quantity of a heat medium supplied to the heat exchanger 235 provided on the upstream side by means of the gas temperature at the inlet a of the catalytic oxidation apparatus 236 and/or the concentration of metallic mercury or mercury chloride at the outlet b thereof. When the gas temperature is detected and controlled, the gas temperature at the inlet a of the catalytic oxidation apparatus 236 is detected, the detected temperature is compared with a reference temperature preset according to the type of fuel in the temperature controller 140, and a flow rate regulation signal is sent to the heat medium flow rate regulating valve 241 according to the change amount. By the regulation of the heat medium flow rate regulating valve 241, the quantity of heat medium supplied to the heat exchanger 235 is changed, and the gas temperature at the outlet of the heat exchanger 235 is controlled so as to be a proper temperature.

Thus, the exhaust gas treatment system shown in FIG. 13 has the catalytic oxidation apparatus 236 which oxidizes metallic mercury in combustion exhaust gas containing $SO_x$ and mercury into mercury chloride at a reaction temperature not higher than 300° C. by a solid catalyst, the wet type desulfurization apparatus 237 which removes mercury by means of an alkali absorbing solution, the temperature controller 240 which controls the reaction temperature when metallic mercury is oxidized into mercury chloride, and the like. Therefore, the gas temperature at the outlet of the heat exchanger 235 can be controlled so as to be a proper temperature, so that even for a fuel having a low Cl content, and without the addition of a chlorinating agent (HCl etc.), metallic mercury can be oxidized stably into mercury chloride, by which metallic mercury in exhaust gas can be removed effectively.

SUMMARY OF THE INVENTION

In the process of studying the exhaust gas treatment system disclosed in Japanese Patent Provisional Publication No. 2003-53142, it was found that the mercury removal performance deteriorates with time. Accordingly, an object of the present invention is to provide an exhaust gas treatment method which can restrain the deterioration in mercury removal performance even in a continuous operation on condition that mercury is oxidized in a low temperature region not higher than 300° C. Also, another object of the present invention is to provide an exhaust gas treatment system for realizing the above-described exhaust gas treatment method.

The inventors studied causes for the phenomenon that the mercury removal performance deteriorates with time. As a result, it was confirmed that ammonium sulfate or acid ammonium sulfate (hereinafter referred simply to as ammonium sulfate with both terms inclusive) adheres to an oxidation catalyst. It is understood that this ammonium sulfate is yielded by binding of $NH_3$ introduced into the denitrification apparatus to $SO_2$ contained in exhaust gas. Also, a minute amount of $SO_3$ is contained in exhaust gas in addition to $SO_2$, and it was observed that this $SO_3$ aggregated in pores in the oxidation catalyst. Therefore, it is understood that the adhering ammonium sulfate and the aggregating $SO_3$ cause deterioration in the performance of oxidation catalyst.

In order to maintain the performance of oxidation catalyst, it is necessary to restore the oxidation performance by removing ammonium sulfate and $SO_3$. Washing by water can be thought of as a method for this. However, the energy in order to dry the oxidation catalyst after washing by water is enormous. Also, there is a fear that by repeating washing by water, the strength of oxidation catalyst is decreased, and an active metal contained in the oxidation catalyst is eluted. Therefore, washing by water is not a realistic method for regenerating the oxidation catalyst.

On the other hand, it is desired to restore the oxidation performance during the operation of the exhaust gas treatment system. This is because if the operation of the exhaust gas treatment system is stopped to restore the oxidation performance, efficient exhaust gas treatment cannot be realized. In order to restore the oxidation performance during the operation of the exhaust gas treatment system, providing at least two series of oxidation catalysts can be thought of, wherein while mercury is oxidized by one oxidation catalyst, the oxidation performance of the other oxidation catalyst is restored. In this case, if a long period of time is required to finish the restoration of oxidation performance of the other oxidation catalyst, the performance of one oxidation catalyst deteriorates remarkably. Therefore, it is necessary to use a method for finishing the restoration of oxidation performance in a shorter period of time.

The inventors conducted an experiment in which a gas having a temperature of, for example, about 350° C. is caused to flow in an oxidation catalyst whose performance has been deteriorated by the oxidation of mercury in a low temperature region. Although the details are described later, as the result of this experiment, the results showed that the performance of oxidation catalyst can be restored in a period of time of about one-third the time taken for performance deterioration.

The present invention has been made based on the above-described knowledge, and provides an exhaust gas treatment method including oxidation treatment for converting metallic mercury contained in combustion exhaust gas into mercury chloride; and mercury removal treatment for removing mercury from the combustion exhaust gas by dissolving the mercury chloride in water, wherein a plurality of oxidation catalysts for performing the oxidation treatment are provided, and during the time when the oxidation treatment is performed, at least one of the oxidation catalysts performs catalyst performance restoration treatment without performing the oxidation treatment.

The catalyst performance restoration treatment is to decompose or remove a compound adhering to the oxidation catalyst. This compound contains at least ammonium sulfate and $SO_3$.

Therefore, in the catalyst performance restoration treatment in accordance with the present invention, it is preferable that a gas having a temperature not lower than the decomposition temperature of the compound be supplied to the oxidation catalyst. By the supply of this gas, ammonium sulfate and $SO_3$ are decomposed or set free from the oxidation catalyst.

The present invention provides an exhaust gas treatment system which can realize the above-described exhaust gas treatment method. This exhaust gas treatment system is to remove hazardous trace substances contained in exhaust gas generated in a combustion apparatus, and includes first removal means for removing $NO_x$ contained in the exhaust gas by converting it into $N_2$; catalytic oxidation means for performing oxidation treatment in which metallic mercury contained in the exhaust gas having passed through the first removing means is oxidized into mercury chloride in the presence of an oxidation catalyst; and second removal means for removing mercury chloride and $SO_x$, which are contained in the exhaust gas having passed through the catalytic oxidation means, by gas-liquid contact. The catalytic oxidation means is provided with a plurality of oxidation catalysts each of which performs oxidation treatment independently, and also is provided with restoring gas supply means for selectively supplying performance restoring gas to the oxidation catalysts.

In the exhaust gas treatment system in accordance with the present invention, the performance restoring gas can be supplied to the oxidation catalyst having finished predetermined oxidation treatment. Also, the oxidation catalyst which has been supplied with the performance restoring gas for a predetermined time can restart oxidation treatment immediately after the supply of the performance restoring gas has been stopped or after the predetermined time has elapsed.

Thus, in the present invention, oxidation treatment and performance restoration treatment can be repeated alternately by the oxidation catalyst. At this time, the time for supplying the performance restoring gas to the oxidation catalyst can be set so as to be shorter than the time for performing oxidation treatment, and the start timing of oxidation treatment performed by each of the oxidation catalysts can be made different. Thereby, the oxidation treatment can be performed continuously for the whole of the exhaust gas treatment system, and the oxidation treatment can be performed simultaneously by two or more oxidation catalysts. Also, the performance restoration treatment can be performed at the same time.

In the exhaust gas treatment system in accordance with the present invention, for a predetermined oxidation catalyst, a standby state in which neither the oxidation treatment nor the supply of the performance restoring gas is accomplished is preferably provided. For example, four series of oxidation catalysts are provided, and one of these oxidation catalysts is caused to function as a backup used when any other oxidation catalyst fails.

The exhaust gas treatment system in accordance with the present invention can include a combustion apparatus for generating the performance restoring gas.

In the exhaust gas treatment system in accordance with the present invention, the catalytic oxidation means preferably has a wet type dust collector into which the performance restoring gas having passed through the oxidation catalyst is introduced, the wet type dust collector being provided between the oxidation catalyst and the second removal means. The reason for this is that the performance restoring gas contains $SO_3$, $NH_3$, etc. removed from the oxidation catalyst, and these substances are separated from the performance restoring gas.

The exhaust gas treatment system in accordance with the present invention can include gypsum yielding means for yielding gypsum by mixing an effluent containing $SO_3$, $NH_3$, etc., which has been discharged from the wet type dust collector, with an absorbing solution of the second removal means. Some or the whole of the effluent discharged from the wet type dust collector can be used as the absorbing solution of the second removal means.

The present invention provides a catalytic oxidation apparatus used for the above-described exhaust gas treatment system. This catalytic oxidation apparatus has an oxidation catalyst for oxidizing metallic mercury by supplying combustion exhaust gas, and restores oxidation performance by supplying heating gas to the oxidation catalyst whose oxidation performance has been deteriorated by the presence of a compound adhered by oxidation treatment. The catalytic oxidation apparatus includes a plurality of oxidation chambers through which the combustion exhaust gas passes independently; an oxidation catalyst disposed in each of the oxidation chambers; first flow path opening/closing means disposed at the upstream side of the oxidation catalyst in each of the oxidation chambers and second flow path opening/closing means disposed at the downstream side thereof; and a heating gas supply path for selectively supplying the heating gas to the oxidation catalyst.

The catalytic oxidation apparatus in accordance with the present invention preferably has a form such that the heating gas is supplied, through the heating gas supply path, to the oxidation catalyst in a state in which the supply of the combustion exhaust gas is stopped by closing the first and second flow path opening/closing means. It is preferable that at this time, the heating gas flows into a portion between the first flow path opening/closing means and the oxidation catalyst; the flowed-in heating gas passes through an oxidation catalyst; and the heating gas having passed through the oxidation catalyst be discharged through a portion between the oxidation catalyst and the second flow path opening/closing means.

As described above, in accordance with the present invention, there are provided an exhaust gas treatment method and an exhaust gas treatment system, which can restrain the deterioration in mercury removal performance even in continuous operation on condition that mercury is oxidized in a low temperature region not higher than 300° C.

Figure 1:
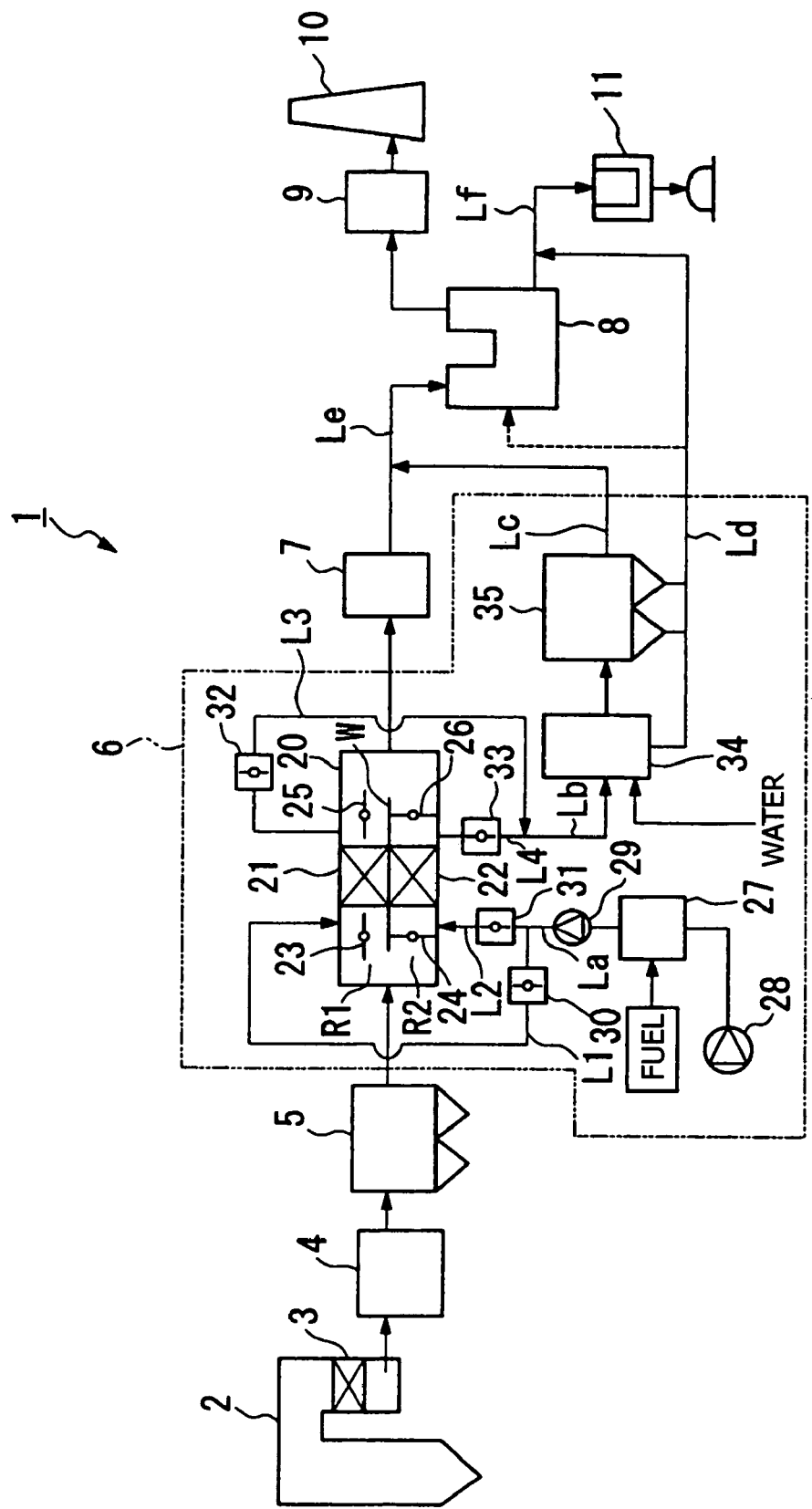
FIG. 1 is a flowchart showing a configuration of an exhaust gas treatment system in accordance with a first embodiment.

In the above-described FIGS. 1 to 13, reference numeral 1 denotes an exhaust gas treatment system, 2 denotes a boiler, 3 denotes a denitrification apparatus, 4 denotes an air heater, 5 denotes a dust collector, 6 denotes a catalytic oxidation apparatus, 7 denotes a heat exchanger, 8 denotes a desulfurization absorption tower, 9 denotes a reheater, 10 denotes a stack, 11 denotes gypsum separating means, 20 denotes a catalytic oxidation apparatus body, 21 denotes a first oxidation catalyst, 22 denotes a second oxidation catalyst, 23 denotes a first upstream damper, 24 denotes a second upstream damper, 25 denotes a first downstream damper, 26 denotes a second downstream damper, 27 denotes a combustion furnace, 28 and 29 each denote a blower, 30, 31, 32 and 33 each denote a damper, 34 denotes a cooling tower, 35 denotes a dust collector, 40 denotes a catalytic oxidation apparatus body, 41 denotes a first oxidation catalyst, 42 denotes a second oxidation catalyst, 43 denotes a third oxidation catalyst, 44 denotes a fourth oxidation catalyst, 45a and 45b each denote a first upstream damper, 46a and 46b each denote a second upstream damper, 47a and 47b each denote a third upstream damper, 48a and 48b each denote a fourth upstream damper, 49a and 49b each denote a first downstream damper, 50a and 50b each denote a second downstream damper, 51a and 51b each denote a third downstream damper, 52a and 52b each denote a fourth downstream damper, 53 and 54 each denote a duct, 55, 56, 57, 58, 59, 60, 61 and 62 each denote a damper, R1, R2, R3 and R4 each denote an oxidation chamber, and W, W1, W2 and W3 each denote a partition wall.

DETAILED DESCRIPTION OF THE PREFERRED EMBODIMENTS

The present invention will now be described in detail with reference to embodiments shown in the accompanying drawings.

First Embodiment

Figure 2:
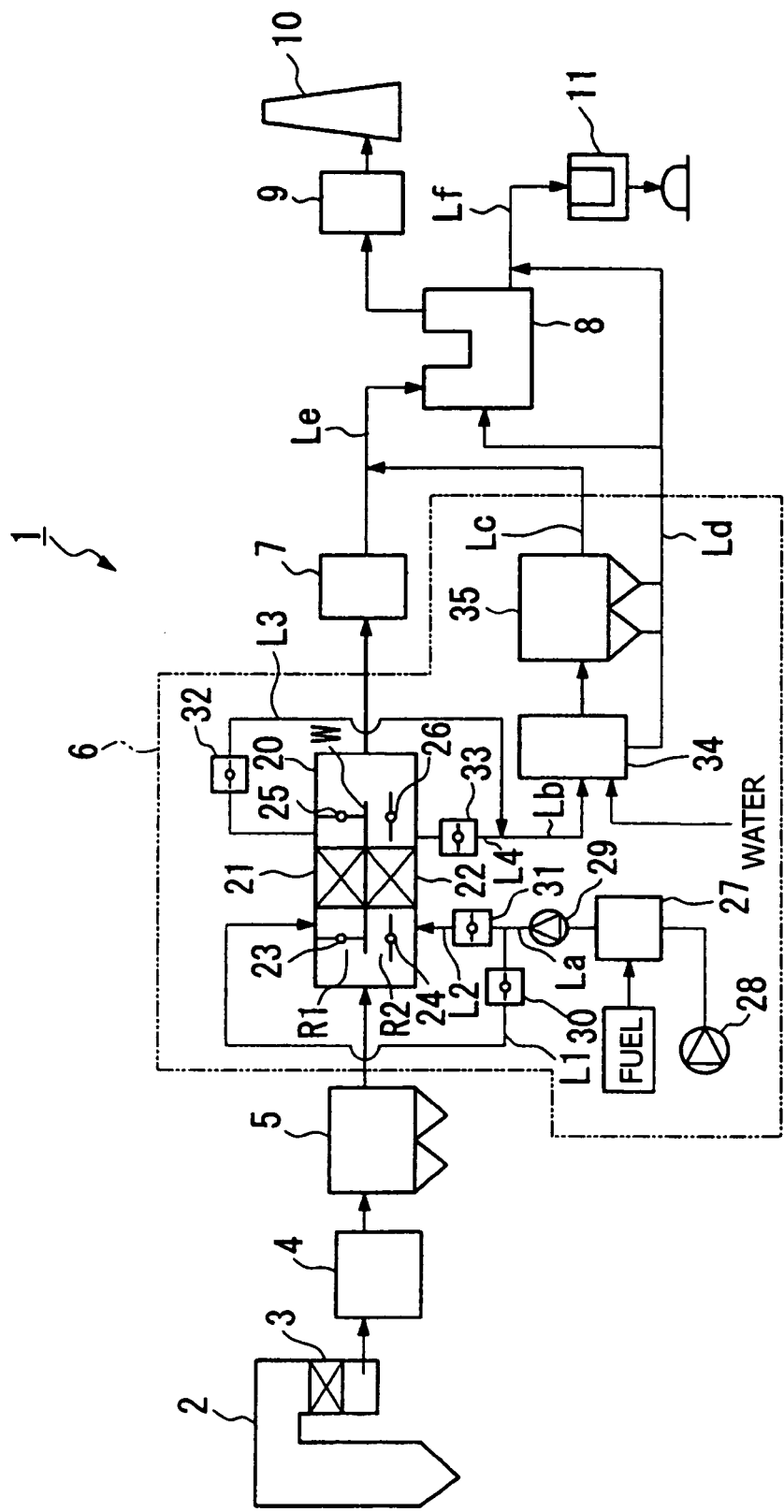
FIG. 2 is a flowchart showing a configuration of an exhaust gas treatment system in accordance with a first embodiment.

FIGS. 1 and 2 are flowcharts showing a configuration of an exhaust gas treatment system 1 in accordance with a first embodiment. The exhaust gas treatment system 1 removes $NO_x$, $SO_x$ and also mercury contained in exhaust gas discharged from a boiler 2.

As shown in FIGS. 1 and 2, the exhaust gas treatment system 1 has a denitrification apparatus 3 attached to the boiler 2. The exhaust gas discharged from the boiler 2 is denitrified by the denitrification apparatus 3, and is introduced into a dust collector 5 after passing through an air heater 4. The exhaust gas having passed through the dust collector 5 is introduced into a desulfurization absorption tower 8 after passing through a catalytic oxidation apparatus 6 and a heat exchanger 7. The exhaust gas having passed through the desulfurization absorption tower 8 is discharged into the atmosphere from a stack 10 after passing through a reheater 9.

In the denitrification apparatus 3, $NO_x$ contained in exhaust gas is converted into nitrogen by the aforementioned equations (1) and (2), and is removed. The temperature of exhaust gas after denitrification is in the range of, for example, 350 to 420° C.

The dust collector 5 into which the exhaust gas having a temperature, for example, not higher than 160° C. is introduced after passing through the air heater 4 is not subject to any special restriction, and may be one which can make rough dust collection.

The temperature of exhaust gas from which mercury has been removed by the catalytic oxidation apparatus 6 becomes, for example, 90 to 100° C. because thermal energy is recovered by the heat exchanger 7. The catalytic oxidation apparatus 6, which is a characteristic portion in accordance with this embodiment, is described later.

The desulfurization absorption tower 8 into which the exhaust gas from which mercury has been removed is introduced is not subject to any special restriction, and a wet type desulfurization apparatus generally used for flue gas treatment or a desulfurization apparatus provided with a cooling tower at the preceding stage of an absorption tower can be used as the desulfurization absorption tower 8. The temperature of the exhaust gas discharged from the desulfurization absorption tower 8 decreases to, for example, 50 to 60° C.

The reheater 9 located on the downstream side of the desulfurization absorption tower 8 heats the exhaust gas whose temperature has decreased to, for example, 50 to 60° C. to a temperature of, for example, about 90 to 100° C. If the exhaust gas whose temperature has decreased is discharged into the atmosphere from the stack 10 without being reheated, there arises a problem of the generation of white fumes due to water vapor. To avoid this problem, the exhaust gas is heated to a temperature such that this problem does not arise by the reheater 9.

The heat exchanger 7 and the reheater 9 each are constructed by a gas heater of a type such that thermal energy is exchanged with a predetermined heat medium used as a medium. The heat exchanger 7 and the reheater 9 each may be a gas heater which is of a separate system or effects heat exchange directly if they can cool and heat the exhaust gas.

The catalytic oxidation apparatus 6 disposed between the dust collector 5 and the heat exchanger 7 has a function of oxidizing metallic mercury (Hg) contained in exhaust gas into mercury chloride ($Hg_2Cl_2$ or $HgCl_2$). Also, the catalytic oxidation apparatus 6 has a regeneration function of restoring the oxidation performance of the oxidation catalyst that has oxidized metallic mercury. To perform these two functions, the catalytic oxidation apparatus 6 has a configuration as described below. The catalytic oxidation apparatus 6 may be disposed between the heat exchanger 7 and the desulfurization absorption tower 8.

The catalytic oxidation apparatus 6 has a catalytic oxidation apparatus body 20 to which the exhaust gas discharged from the dust collector 5 is supplied. The catalytic oxidation apparatus body 20 is divided into two (upper and lower in the figure) oxidation chambers R1 and R2, which can perform oxidation treatment independently, by a partition wall W. In one oxidation chamber R1 is provided a first oxidation catalyst 21, and in the other oxidation chamber R2 is provided a second oxidation catalyst 22. The exhaust gas discharged from the boiler 2 contains a Cl component in fuel as HCl, and on the first oxidation catalyst 21 and the second oxidation catalyst 22, metallic mercury contained in the exhaust gas is oxidized into mercury chloride by the aforementioned equation (3).

As the oxidation catalyst, a catalyst in which at least one kind (radical) of Pt, Ru, Rh, Rd, Ir, V, W, Mo, Ni, Co, Fe, Cr, Cu and Mn is carried on a porous carrier such as at least one kind of $TiO_2$, $SiO_2$, $ZrO_2$, $Al_2O_3$ and $WO_3$ and/or zeolite etc. can be used.

Also, as the oxidation catalyst, a solid catalyst in which at least one kind of metal selected from Ni, Ru, Rh, Pd and Pt and silver sulfate or a precursor of silver sulfate are contained in a carrier of at least one kind of hydroxide or oxide selected from Si, Ti and Zr and/or hydroxide or oxide etc. of Al and which is obtained by firing stabilization can also be used. However, this is only an example, and the use of other catalysts is not excluded.

On the upstream side of the first oxidation catalyst 21 and the second oxidation catalyst 22, a first upstream damper 23 and a second upstream damper 24 are provided, respectively. Also, on the downstream side of the first oxidation catalyst 21 and the second oxidation catalyst 22, a first downstream damper 25 and a second downstream damper 26 are provided, respectively.

The first upstream damper 23 controls the supply of the exhaust gas having passed through the dust collector 5 to the first oxidation catalyst 21. The first upstream damper 23 shown in FIG. 1 is in an "open" state with respect to the exhaust gas having passed through the dust collector 5, and a damper 30 is in a "closed" state with respect to performance restoring gas. Therefore, the exhaust gas having passed through the dust collector 5 is supplied to the first oxidation catalyst 21. On the other hand, the first upstream damper 23 shown in FIG. 2 is in a "closed" state with respect to the exhaust gas having passed through the dust collector 5, and the damper 30 is in an "open" state with respect to performance restoring gas. Therefore, the performance restoring gas from a combustion furnace 27 is supplied to the first oxidation catalyst 21, but the supply of the exhaust gas having passed through the dust collector 5 to the first oxidation catalyst 21 is inhibited.

Similarly, the second upstream damper 24 controls the supply of the exhaust gas having passed through the dust collector 5 to the second oxidation catalyst 22. The second upstream damper 24 shown in FIG. 1 is in a "closed" state with respect to the exhaust gas having passed through the dust collector 5, and a damper 31 is in an "open" state with respect to the performance restoring gas. Therefore, the performance restoring gas from the combustion furnace 27 is supplied to the second oxidation catalyst 22, but the inflow of the exhaust gas having passed through the dust collector 5 to the second oxidation catalyst 22 is inhibited. On the other hand, the second upstream damper 24 shown in FIG. 2 is in an "open" state with respect to the exhaust gas having passed through the dust collector 5, and the damper 31 is in a "closed" state with respect to the performance restoring gas. Therefore, the supply of the performance restoring gas from the combustion furnace 27 to the second oxidation catalyst 22 is inhibited, but the exhaust gas having passed through the dust collector 5 is supplied to the second oxidation catalyst 22.

The first downstream damper 25 controls whether the exhaust gas having passed through the first oxidation catalyst 21 is discharged to heat exchanger 7 or the performance restoring gas having passed through the first oxidation catalyst 21 is discharged to a cooling tower 34, described later. FIG. 1 shows a state in which the exhaust gas having passed through the first oxidation catalyst 21 is discharged to heat exchanger 7, and FIG. 2 shows a state in which the performance restoring gas having passed through the first oxidation catalyst 21 is discharged to the cooling tower 34.

Similarly, the second downstream damper 26 controls whether the exhaust gas having passed through the second oxidation catalyst 22 is discharged to heat exchanger 7 or the performance restoring gas having passed through the second oxidation catalyst 22 is discharged to the cooling tower 34. FIG. 1 shows a state in which the performance restoring gas having passed through the second oxidation catalyst 22 is discharged to the cooling tower 34, and FIG. 2 shows a state in which the exhaust gas having passed through the second oxidation catalyst 22 is discharged to heat exchanger 7.

The catalytic oxidation apparatus 6 has a combustion furnace 27. The combustion furnace 27 generates the performance restoring gas for restoring the performance of the first oxidation catalyst 21 and the second oxidation catalyst 22, whose oxidation performance has been deteriorated, by the combustion of a fuel. The performance restoring gas preferably has a temperature not lower than 220° C. because the decomposition temperature of acid ammonium sulfate is 220° C. On the other hand, the temperature of the performance restoring gas is preferably not higher than 500° C. because if the performance restoring gas has a temperature higher than necessary, there is a fear that the oxidation catalyst is fired, and hence the specific surface area is decreased. A further preferable temperature of the performance restoring gas is 300 to 400° C. A flow path La connected to the combustion furnace 27 branches into flow paths L1 and L2 at a midway position. The flow path L1 is connected to a portion between the first upstream damper 23 and the first oxidation catalyst 21 in the first oxidation chamber R1, and the flow path L2 is connected to a portion between the second upstream damper 24 and the second oxidation catalyst 22 in the second oxidation chamber R2. The damper 30 is provided in the flow path L1, and the damper 31 is provided in the flow path L2. The damper 30 controls whether or not the performance restoring gas generated in the combustion furnace 27 is supplied to the first oxidation chamber R1. Also, the damper 31 controls whether or not the performance restoring gas generated in the combustion furnace 27 is supplied to the second oxidation chamber R2. In FIG. 1, the first damper 30 is closed, and the second damper 31 is open, so that the performance restoring gas generated in the combustion furnace 27 is supplied to the second oxidation chamber R2. In FIG. 2, the first damper 30 is open, and the second damper 31 is closed, so that the performance restoring gas generated in the combustion furnace 27 is supplied to the first oxidation chamber R1. The performance restoring gas generated in the combustion furnace 27 is supplied to the flow path La by blowers 28 and 29. As described above, the catalytic oxidation apparatus 6 has means for selectively supplying the performance restoring gas to the first and second oxidation catalysts 21 and 22.

A flow path L3 is connected to a portion between the first oxidation catalyst 21 and the first downstream damper 25 in the catalytic oxidation apparatus body 20, and a flow path L4 is connected to a portion between the second oxidation catalyst 22 and the second downstream damper 26 in the catalytic oxidation apparatus body 20. A damper 32 is provided in the flow path L3, and a damper 33 is provided in the flow path L4. The flow path L3 and the flow path L4 joins to each other to form a flow path Lb. The flow path Lb is connected to the cooling tower 34.

The damper 32 selectively controls whether the supply of the exhaust gas having passed through the first oxidation catalyst 21 to the cooling tower 34 via the flow paths L3 and Lb is inhibited or the performance restoring gas having passed through the first oxidation catalyst 21 is supplied to the cooling tower 34 via the flow paths L3 and Lb. Similarly, the damper 33 selectively controls whether the supply of the exhaust gas having passed through the second oxidation catalyst 22 to the cooling tower 34 via the flow paths L4 and Lb is inhibited or the performance restoring gas having passed through the second oxidation catalyst 22 is supplied to the cooling tower 34 via the flow paths L4 and Lb.

FIG. 1 shows a state in which the damper 32 is closed, and on the other hand, the damper 33 is open, so that the inflow of the exhaust gas having passed through the first oxidation catalyst 21 to the cooling tower 34 is inhibited, and the performance restoring gas having passed through the second oxidation catalyst 22 flows into the cooling tower 34. On the other hand, FIG. 2 shows a state in which the damper 32 is open, and on the other hand, the damper 33 is closed, so that the performance restoring gas having passed through the first oxidation catalyst 21 is supplied to the cooling tower 34, and the inflow of the exhaust gas having passed through the second oxidation catalyst 22 to the cooling tower 34 is inhibited.

The flow path Lb is connected with the cooling tower 34, and further with a dust collector 35. The performance restoring gas flowing in the flow path Lb is cooled to, for example, about 70 to 90° C. by the cooling tower 34, and thereafter is introduced into the dust collector 35. $SO_3$ and $NH_3$ contained in the performance restoring gas are separated and removed in this process. As the dust collector 35, a publicly known wet type dust collector can be used.

To the cooling tower 34 and the dust collector 35 are connected a flow path Lc and a flow path Ld. The flow path Lc is connected to a flow path Le which connects the heat exchanger 7 with the desulfurization absorption tower 8. Also, the flow path Ld is connected to the desulfurization absorption tower 8. Therefore, the performance restoring gas from which $SO_3$ and $NH_3$ have been separated and removed is supplied to the desulfurization absorption tower 8 via the flow path Le, and the separated and removed $SO_3$ and $NH_3$ is supplied, as an effluent, to gypsum separating means 11 disposed on the downstream side of the desulfurization absorption tower 8. The gypsum separating means 11 is also supplied with an effluent from the desulfurization absorption tower 8, and this effluent is mixed with the effluent from the dust collector 35 and is subjected to predetermined treatment, by which gypsum is separated. The effluent from the dust collector 35 may be supplied directly to the desulfurization absorption tower 8.

Since the catalytic oxidation apparatus 6 has the above-described construction, treatment for oxidizing mercury contained in exhaust gas into mercury chloride can be performed by the first oxidation catalyst 21, and at the same time, regeneration treatment can be performed by the second oxidation catalyst 22. FIG. 1 shows this state. Inversely, regeneration treatment can be performed by the first oxidation catalyst 21, and at the same time, treatment for oxidizing mercury contained in exhaust gas into mercury chloride can be performed by the second oxidation catalyst 22. FIG. 2 shows this state.

During the time when the exhaust gas treatment system 1 is operated, a plurality of patterns for operating the catalytic oxidation apparatus 6 exist. Two patterns are explained with reference to FIGS. 3 and 4. As described above, the restoration of oxidation performance (hereinafter referred to as regeneration) can be finished in a short period of time as compared with the deterioration in performance. Therefore, this fact is taken for granted.

Figure 3:
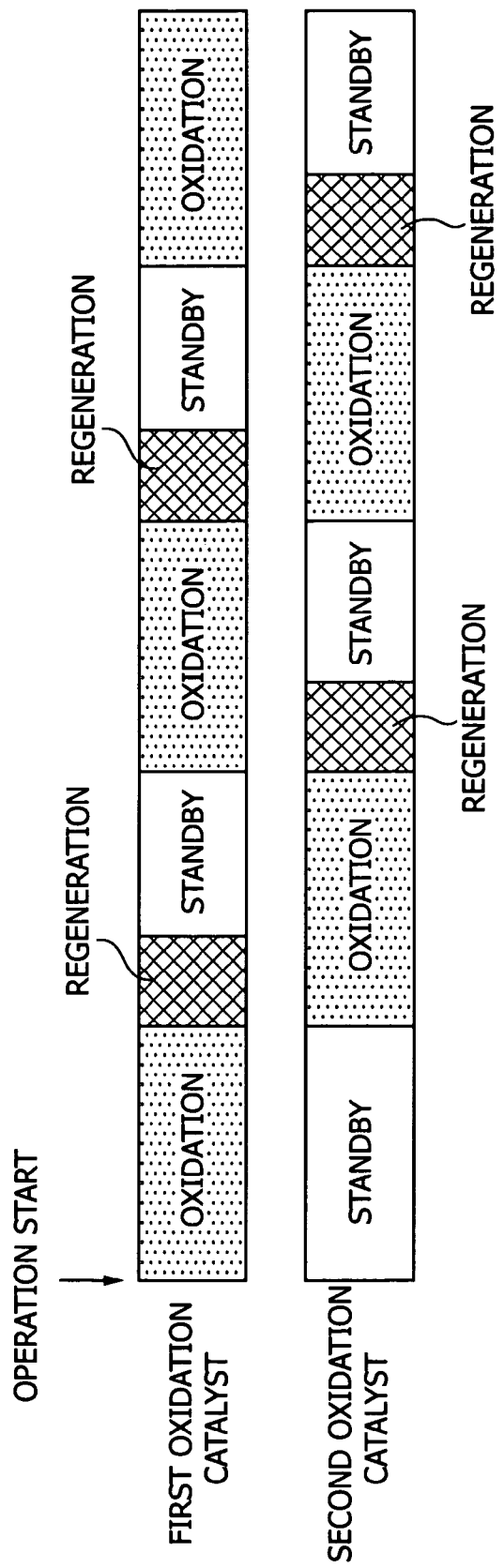
FIG. 3 is a timing chart showing one example of an operation state of an exhaust gas treatment system in accordance with a first embodiment.

FIG. 3 shows a pattern in which oxidation treatment of mercury is performed alternately by the first oxidation catalyst 21 and the second oxidation catalyst 22. In this pattern, as shown in FIG. 3, the oxidation treatment of mercury is started by using the first oxidation catalyst 21 at the time when the operation of the exhaust gas treatment system 1 is started. At this time, the second oxidation catalyst 22 is in a standby state. The standby state means a state in which neither oxidation treatment nor regeneration treatment is performed. After a predetermined time in which the deterioration in oxidation performance is anticipated has elapsed, the oxidation treatment of mercury using the first oxidation catalyst 21 is finished, and the oxidation treatment of mercury using the second oxidation catalyst 22 is started. At the same time, the first oxidation catalyst 21 starts regeneration treatment. After the regeneration treatment for a predetermined time is finished, the first oxidation catalyst 21 becomes in the standby state. After the oxidation treatment for predetermined time performed by the second oxidation catalyst 22 is finished, the second oxidation catalyst 22 transfers to regeneration treatment. At the same time, oxidation treatment is performed by the first oxidation catalyst 21. Subsequently, the same treatment is repeated, by which the regeneration treatment of the first oxidation catalyst 21 and the second oxidation catalyst 22 can be performed while the oxidation treatment of mercury is performed continuously by the catalytic oxidation apparatus 6.

Figure 4:
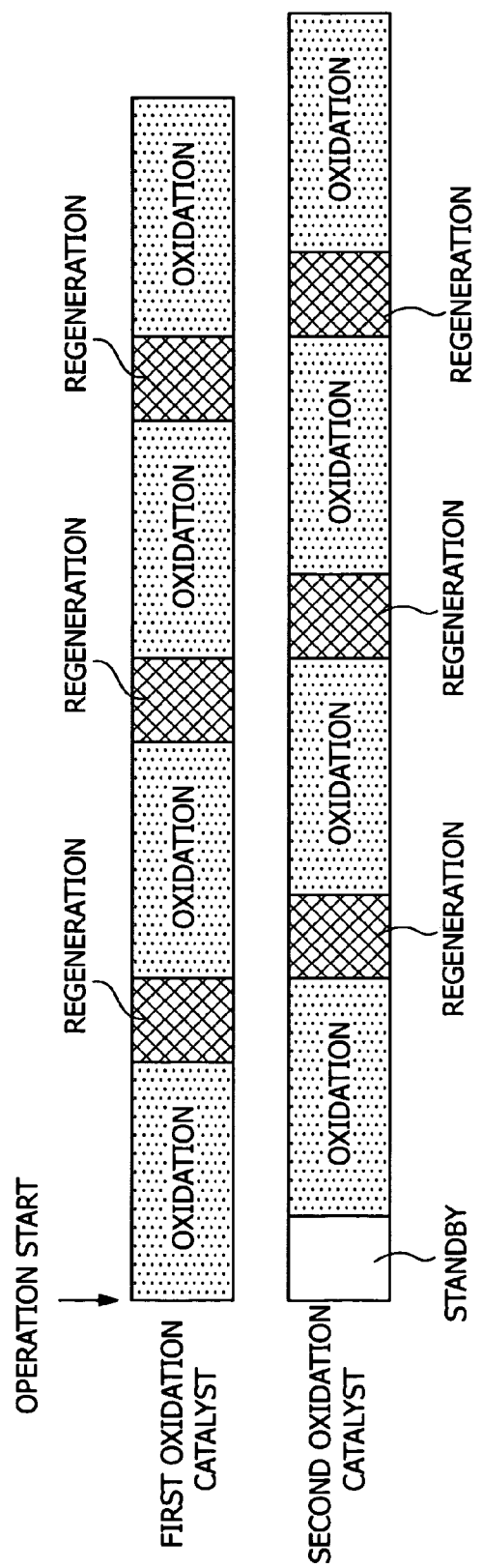
FIG. 4 is a timing chart showing another example of an operation state of an exhaust gas treatment system in accordance with a first embodiment.

FIG. 4 shows a pattern in which the first oxidation catalyst 21 and the second oxidation catalyst 22 can perform oxidation treatment of mercury at the same time.

In this pattern, a shown in FIG. 4, the oxidation treatment of mercury is started by using the first oxidation catalyst 21 at the time when the operation of the exhaust gas treatment system 1 is started. At this time, the second oxidation catalyst 22 is in a standby state. This process is the same as the process of the pattern shown in FIG. 3. In the pattern shown in FIG. 4, the second oxidation catalyst 22 starts oxidation treatment during the time when oxidation treatment is being performed by the first oxidation catalyst 21. Therefore, the first oxidation catalyst 21 and the second oxidation catalyst 22 can perform oxidation treatment at the same time. After finishing the oxidation treatment for a predetermined time, the first oxidation catalyst 21 transfers to regeneration treatment. The second oxidation catalyst 22 continues the oxidation treatment until the first oxidation catalyst 21 finishes the regeneration treatment, and subsequently transfers to regeneration treatment. After finishing the regeneration treatment, the first oxidation catalyst 21 starts oxidation treatment without standby. Subsequently, the same treatment is repeated.

In the pattern shown in FIG. 4, since the first oxidation catalyst 21 and the second oxidation catalyst 22 can perform oxidation treatment of mercury at the same time, high oxidation treatment performance can be maintained. In particular, after the oxidation performance of the first oxidation catalyst 21 (the second oxidation catalyst 22) has deteriorated, oxidation treatment is performed by using the second oxidation catalyst 22 (the first oxidation catalyst 21) having high oxidation performance, which has been subjected to regeneration treatment, so that stable oxidation performance can be obtained.

Although two patterns have been explained in the above description, the present invention is not limited to these two patterns. It is a matter of course that oxidation treatment and regeneration treatment can be performed by any other pattern.

Also, in the above description, the case where oxidation treatment and regeneration treatment are switched over by controlling time has been explained. In this case, the first upstream damper 23, the operations of the second upstream damper 24, the first downstream damper 25, the second downstream damper 26, and dampers 30 to 33 have only to be controlled by a timer provided separately. Also, for example, oxidation treatment and regeneration treatment are switched over based on the mercury concentration detected by a mercury concentration meter provided on the downstream side of the desulfurization absorption tower 8.

Further, unless departing from the gist of the present invention, the configurations described in the above-described embodiment can be chosen or can be changed appropriately to other configurations.

Second Embodiment

An exhaust gas treatment system in accordance with a second embodiment will be described with reference to FIGS. 5 to 7.

The exhaust gas treatment system in accordance with the second embodiment has the same basic configuration as that of the exhaust gas treatment system 1 in accordance with the first embodiment, and only the catalytic oxidation apparatus is different. Therefore, in the description below, this different point is mainly explained. Hereunder, the same reference numerals are applied to the same elements as those in the first embodiment.

The exhaust gas treatment system in accordance with the second embodiment is provided with four oxidation catalysts capable of performing oxidation treatment independently. FIG. 5 is a transparent perspective view of a catalytic oxidation apparatus body 40, which is an essential portion of the catalytic oxidation apparatus.

Into the catalytic oxidation apparatus body 40, the exhaust gas having passed through the dust collector 5 flows through an upper end opening. Also, the exhaust gas subjected to oxidation treatment is discharged to the heat exchanger 7 through a lower end opening provided in the catalytic oxidation apparatus body 40. The upper end and lower end merely identify positions on FIG. 5.

The catalytic oxidation apparatus body 40 is partitioned into four oxidation chambers R1 to R4 by partition walls W1 to W3. In the oxidation chambers R1 to R4, first to fourth oxidation catalysts 41 to 44 are provided, respectively.

First upstream dampers 45a and 45b are provided on the upstream side of the first oxidation catalyst 41, and first downstream dampers 49a and 49b are provided on the downstream side of the first oxidation catalyst 41. Second upstream dampers 46a and 46b are provided on the upstream side of the second oxidation catalyst 42, and second downstream dampers 50a and 50b are provided on the downstream side of the second oxidation catalyst 42. Third upstream dampers 47a and 47b are provided on the upstream side of the third oxidation catalyst 43, and third downstream dampers 51a and 51b are provided on the downstream side of the third oxidation catalyst 43. Fourth upstream dampers 48a and 48b are provided on the upstream side of the fourth oxidation catalyst 44, and fourth downstream dampers 52a and 52b are provided on the downstream side of the fourth oxidation catalyst 44.

The first upstream dampers 45a and 45b, the second upstream dampers 46a and 46b, the third upstream dampers 47a and 47b, and the fourth upstream dampers 48a and 48b control the supply of the exhaust gas having passed through the dust collector 5 to the first oxidation catalyst 41, the second oxidation catalyst 42, the third oxidation catalyst 43, and the fourth oxidation catalyst 44, respectively, like the first upstream damper 23 (the second upstream damper 24) of the first embodiment. Also, the first upstream dampers 45a and 45b, the second upstream dampers 46a and 46b, the third upstream dampers 47a and 47b, and the fourth upstream dampers 48a and 48b control the supply of the performance restoring gas from the combustion furnace 27 to the first oxidation catalyst 41, the second oxidation catalyst 42, the third oxidation catalyst 43, and the fourth oxidation catalyst 44, respectively.

The first downstream dampers 49a and 49b, the second downstream dampers 50a and 50b, the third downstream dampers 51a and 51b, and the fourth downstream dampers 52a and 52b discharge the exhaust gas having passed through the first oxidation catalyst 41, the second oxidation catalyst 42, the third oxidation catalyst 43, and the fourth oxidation catalyst 44, respectively, to the heat exchanger 7, or discharge the performance restoring gas having passed through the first oxidation catalyst 41, the second oxidation catalyst 42, the third oxidation catalyst 43, and the fourth oxidation catalyst 44, respectively, to the cooling tower 34, described later.

The catalytic oxidation apparatus body 40 is connected with a duct 53 and a duct 54. The duct 53 is connected to the combustion furnace 27, and the duct 54 is connected to the cooling tower 34. The performance restoring gas generated in the combustion furnace 27 flows into the catalytic oxidation apparatus body 40 through the duct 53, and is discharged through the duct 54.

The duct 53 is connected to a portion between the first upstream dampers 45a and 45b, the second upstream dampers 46a and 46b, the third upstream dampers 47a and 47b, and the fourth upstream dampers 48a and 48b and the first oxidation catalyst 41, the second oxidation catalyst 42, the third oxidation catalyst 43, and the fourth oxidation catalyst 44. Also, the duct 54 is connected to a portion between the first oxidation catalyst 41, the second oxidation catalyst 42, the third oxidation catalyst 43, and the fourth oxidation catalyst 44 and the first downstream dampers 49a and 49b, the second downstream dampers 50a and 50b, the third downstream dampers 51a and 51b, and the fourth downstream dampers 52a and 52b.

Figure 6:
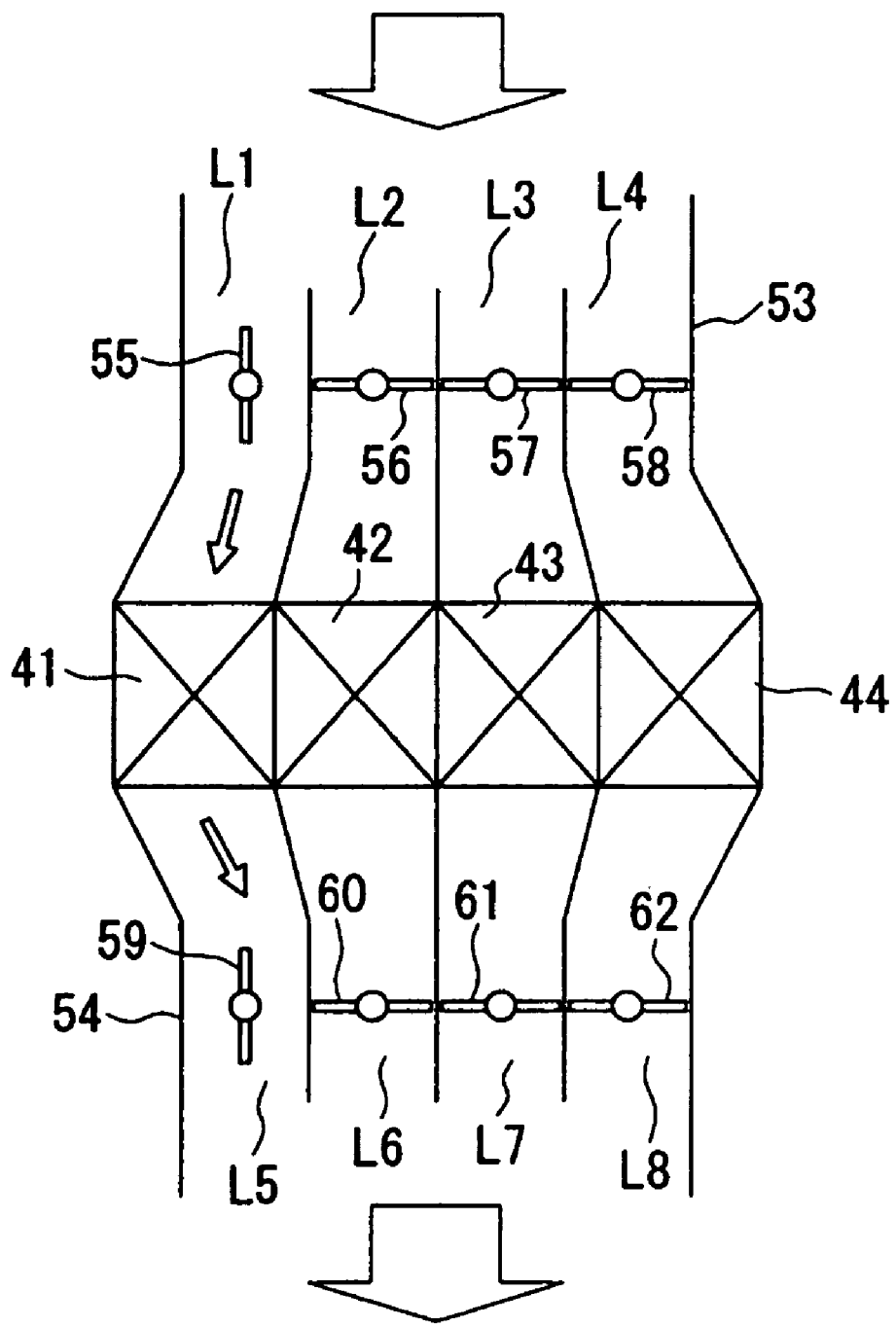
FIG. 6 is a transparent view showing a configuration of a catalytic oxidation apparatus body for an exhaust gas treatment system in accordance with a second embodiment.

FIG. 6 is a plan view schematically showing a state of connection of the ducts 53 and 54 to the catalytic oxidation apparatus body 40. As shown in FIG. 6, the duct 53 is partitioned into four flow paths of L1 to L4, and the duct 54 is partitioned into four flow paths of L5 to L8. In the flow paths L1 to L4, dampers 55 to 58 are provided, respectively, and in the flow paths L5 to L8, dampers 59 to 62 are provided, respectively. The dampers 55 to 58 control the inflow of performance restoring gas to the first oxidation catalyst 41 to the fourth oxidation catalyst 44, respectively. The dampers 59 to 62 control the outflow of performance restoring gas from the first oxidation catalyst 41 to the fourth oxidation catalyst 44, respectively.

Figure 5:
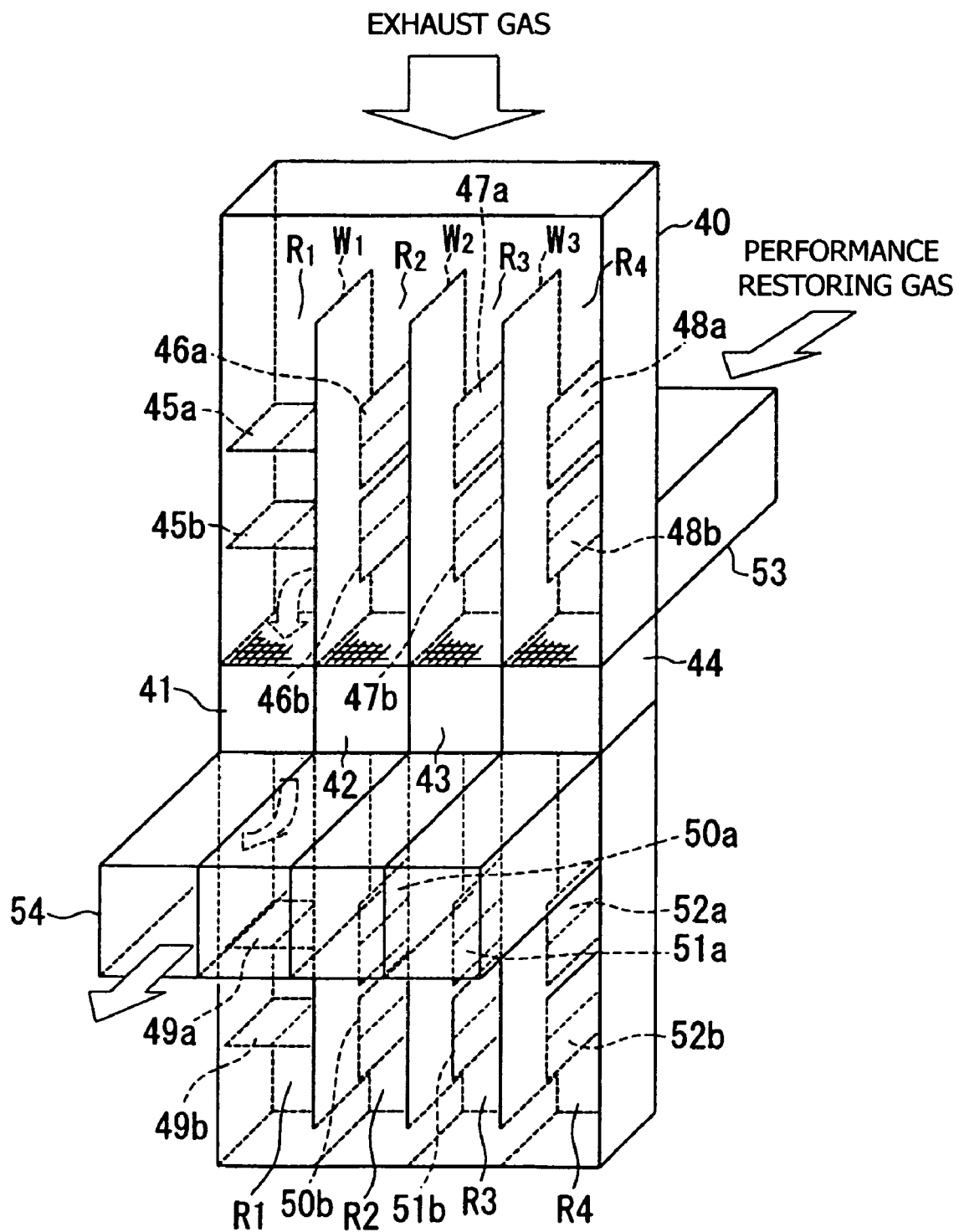
FIG. 5 is a transparent perspective view showing a configuration of a catalytic oxidation apparatus body for an exhaust gas treatment system in accordance with a second embodiment.

In FIGS. 5 and 6, the first upstream dampers 45a and 45b and the first downstream dampers 49a and 49b are closed, but the second upstream dampers 46a and 46b and the second downstream dampers 50a and 50b, the third upstream dampers 47a and 47b and the third downstream dampers 51a and 51b, and the fourth upstream dampers 48a and 48b and the fourth downstream dampers 52a and 52b are open. Also, the dampers 55 and 59 are open, but the dampers 56, 57, 58, 60, 61 and 62 are closed. Therefore, in FIGS. 5 and 6, the exhaust gas having flowed in from the dust collector 5 is subjected to oxidation treatment to remove the contained mercury by the second oxidation catalyst 42 to the fourth oxidation catalyst 44, and thereafter is discharged to the heat exchanger 7. Also, the performance restoring gas having flowed into the duct 53 regenerates the first oxidation catalyst 41 in a process in which the gas passes through the flow path L1, the first oxidation catalyst 41, and the flow path L5.

Patterns for operating the catalytic oxidation apparatus body 40 shown in FIGS. 5 and 6 are explained with reference to FIGS. 7 and 8.

Figure 7:
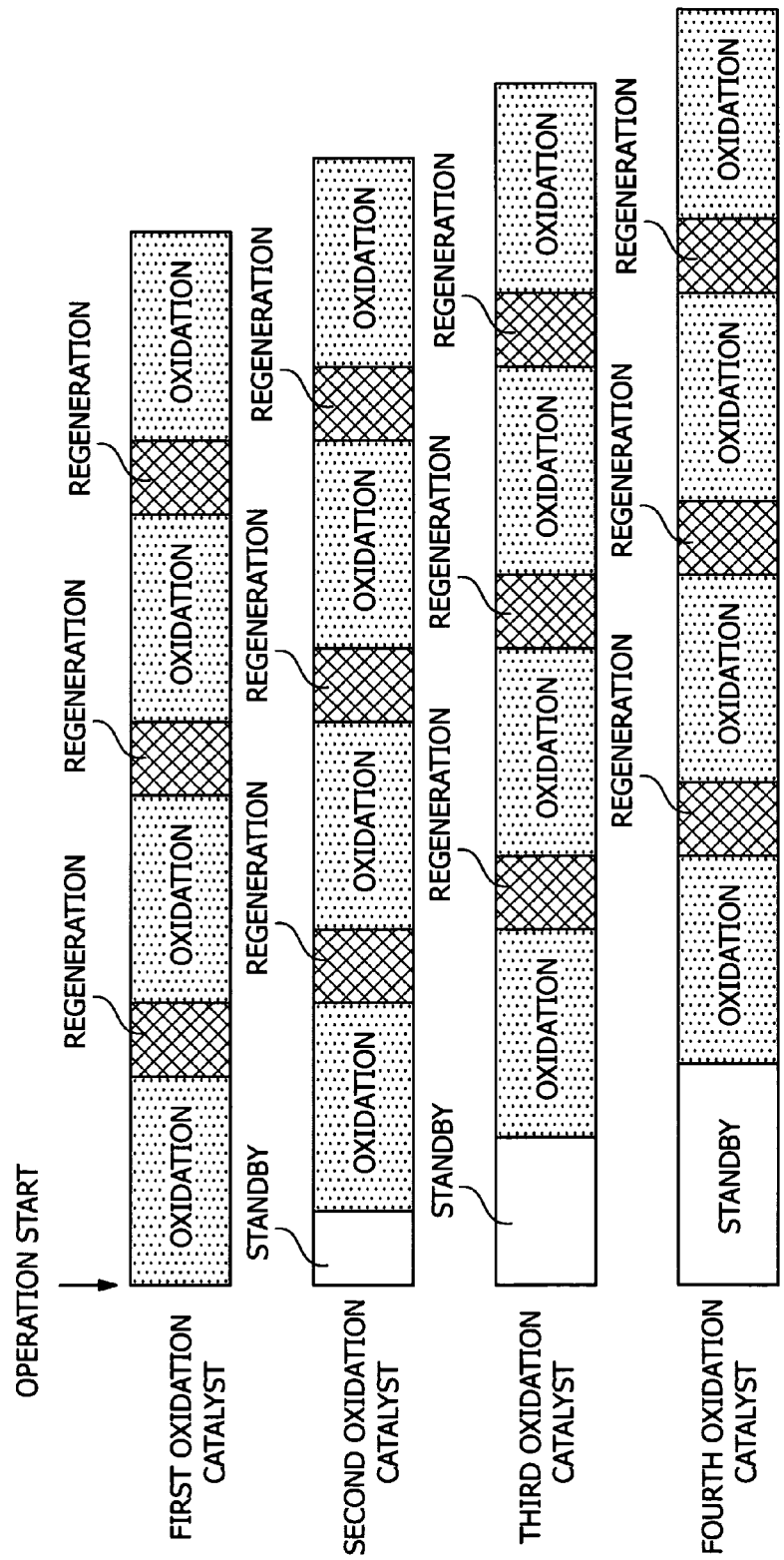
FIG. 7 is a timing chart showing one example of an operation state of an exhaust gas treatment system in accordance with a second embodiment.

FIG. 7 shows a pattern in which oxidation treatment and regeneration treatment are performed continuously by using four oxidation catalysts of the first oxidation catalyst 41 to the fourth oxidation catalyst 44. This pattern is similar to the pattern explained with reference to FIG. 4 in the first embodiment. In this pattern, oxidation treatment can be performed by simultaneously using three oxidation catalysts of the four oxidation catalysts.

Figure 8:
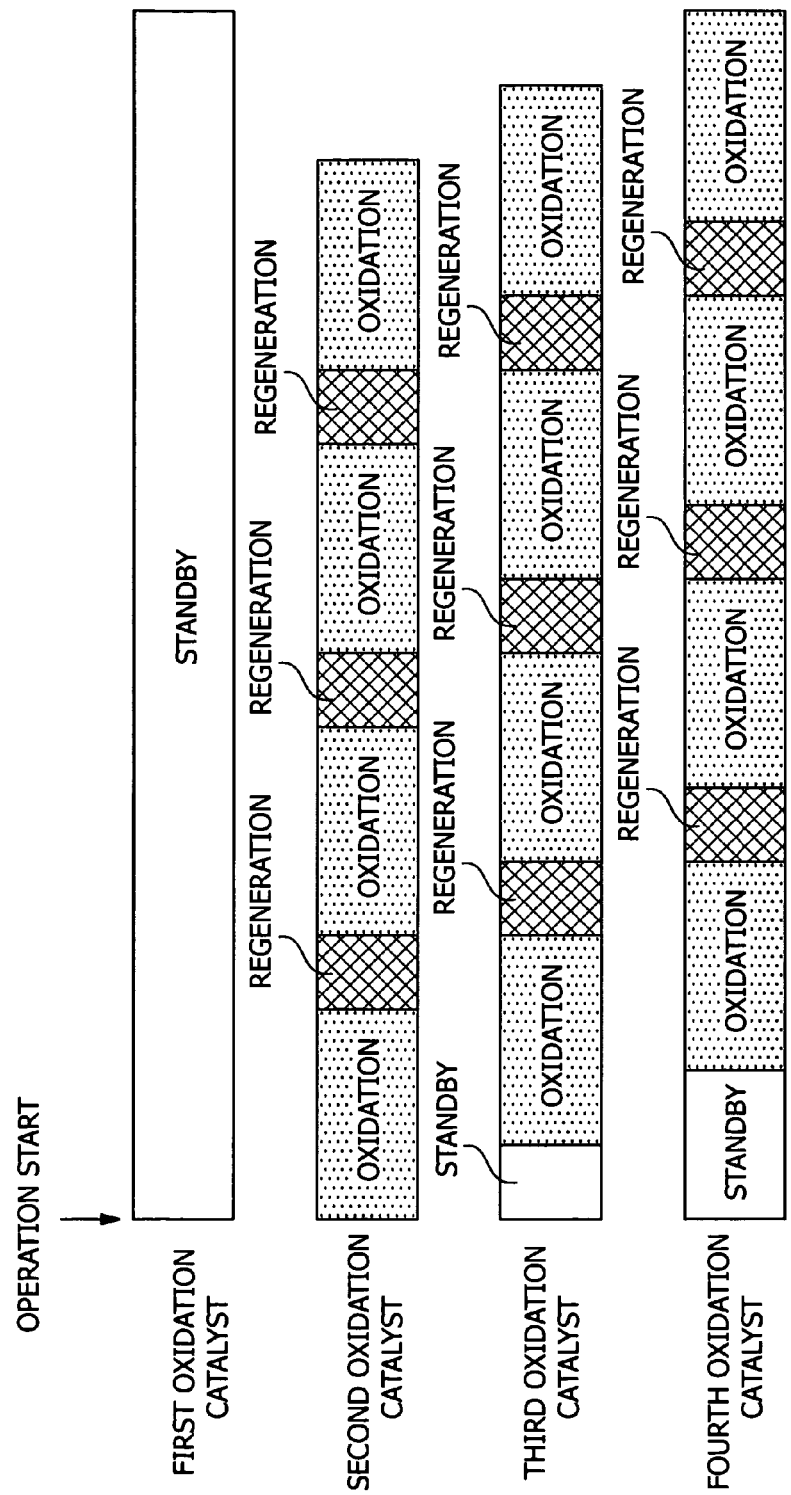
FIG. 8 is a timing chart showing another example of an operation state of an exhaust gas treatment system in accordance with a second embodiment.

FIG. 8 shows a pattern in which oxidation treatment and regeneration treatment are performed continuously by three oxidation catalysts of the second oxidation catalyst 42 to the fourth oxidation catalyst 44 with the first oxidation catalyst 41 being always kept in the standby state. The first oxidation catalyst 41 is kept in the standby state as a backup used when any of the second oxidation catalyst 42 to the fourth oxidation catalyst 44 becomes inoperative. As described above, the use of all oxidation catalysts of the first oxidation catalyst 41 to the fourth oxidation catalyst 44 for oxidation treatment and regeneration treatment is not a must.

EXAMPLE

Finally, an experiment in which a fact that the performance of oxidation catalyst can be restored in a period of time of about one-third the time taken for performance deterioration was verified is explained.

Figure 9:
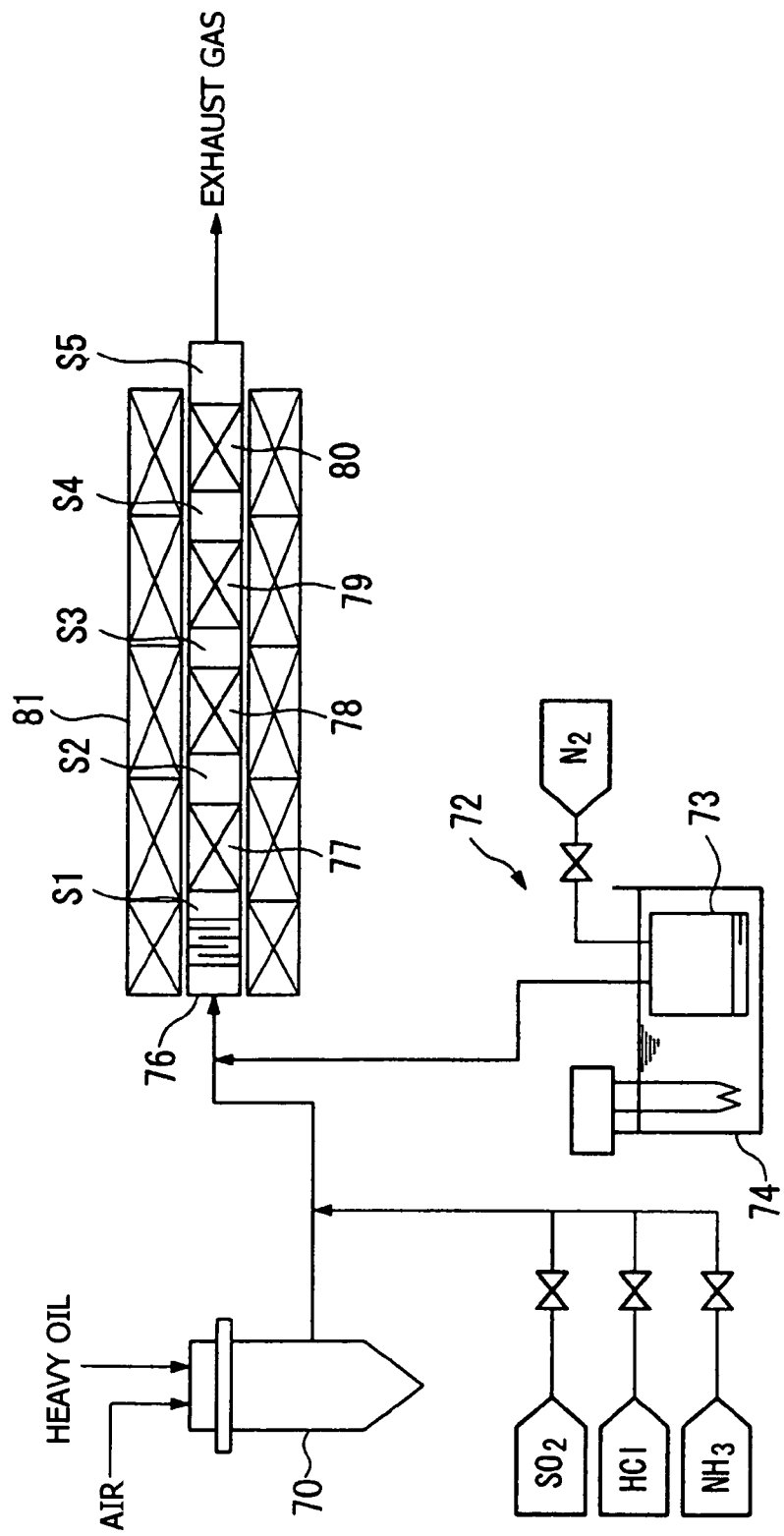
FIG. 9 is a flowchart showing a configuration of an arrangement which is used to conduct an experiment for verifying the effects of the present invention.

FIG. 9 shows an experimental arrangement. The experimental arrangement has a combustion furnace 70 for burning heavy oil. Exhaust gas generated in the combustion furnace 70 is introduced into an oxidation treatment chamber 76 in which four oxidation catalysts 77 to 80 are disposed at predetermined intervals. To the exhaust gas introduced into the oxidation treatment chamber 76, $SO_2$, HCl and $NH_3$ are added. The experimental arrangement also has a mercury vapor generator 72, and mercury vapor generated in this mercury vapor generator 72 is added to the exhaust gas introduced into the oxidation treatment chamber 76. The mercury vapor generator 72 has a construction in which a vessel 73 which stores mercury is held in a thermostatic chamber 74, and $N_2$ is blown into the vessel 73. As described above, by adding $SO_2$, HCl and $NH_3$ and further mercury vapor to the exhaust gas generated in the combustion furnace 70, a simulated gas for experiment was yielded.

Figure 10:
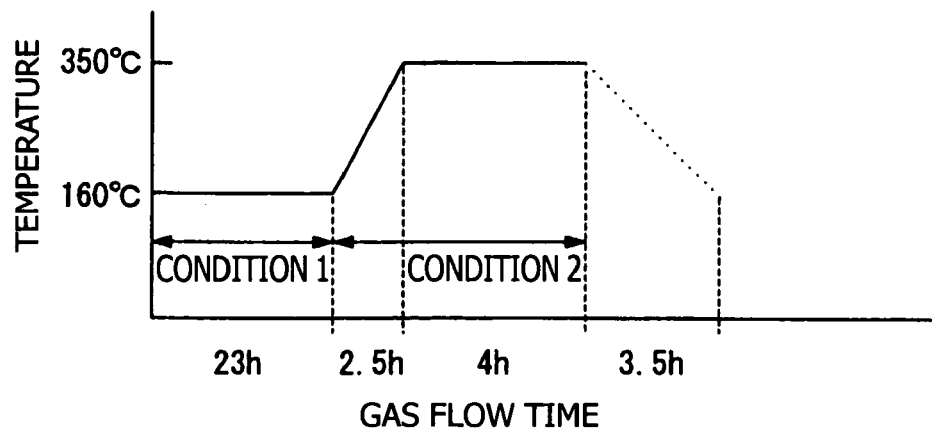
FIG. 10 is a chart showing conditions of experiment for verifying the effects of the present invention.

The experiment was conducted under two conditions. Condition 1 was that exhaust gas was introduced into the oxidation treatment chamber 76 for predetermined time by adding $SO_2$, HCl, $NH_3$ and mercury vapor. Condition 2 was that only the exhaust gas generated in the combustion furnace 70 was introduced into the oxidation treatment chamber for predetermined time by stopping the addition of $SO_2$, HCl, $NH_3$ and mercury vapor after the treatment under Condition 1. The temperature was controlled by a heater 81 so as to be 160° C. under Condition 1 and 350° C. under Condition 2. FIG. 10 shows the relationship between elapsed time and temperature of experiment. Table 1 gives other experimental conditions.

TABLE 1

| Condition | | Condition 1 | Condition 2 |
|---|---|---|---|
| Kind of treatment | | Oxidation treatment | Regeneration treatment |
| Pressure | | Ordinary pressure | Ordinary pressure |
| Additive | $H_2O$; % (wet) | 12 | 12 |
| | $CO_2$; % (dry) | 13 | 13 |
| | $O_2$; % (dry) | 4 | 4 |
| | $N_2$; % (dry) | 71 | 71 |
| | HCl; ppm (dry) | 10 | 0 |
| | $SO_2$; ppm (dry) | 500 | 0 |
| | $NH_3$; ppm (dry) | 10 | 0 |
| | Hg; µg/m³N (dry) | 30 | 0 |
| Temperature (° C.) | | 160 | 350 |
| SV ($h^{-1}$) | | 6000 | |
| Catalyst | | $V_2O_5/WO_3/TiO_2$ | |
| Holding time (h) | | 23 | Temperature rise; 2.5 Regeneration; 4 |

The change in concentration of mercury chloride in S1 to S5 of the oxidation treatment chambers 76 was measured during the treatment under Condition 1 and Condition 2. The measurement results are shown in FIG. 11.

Figure 11:
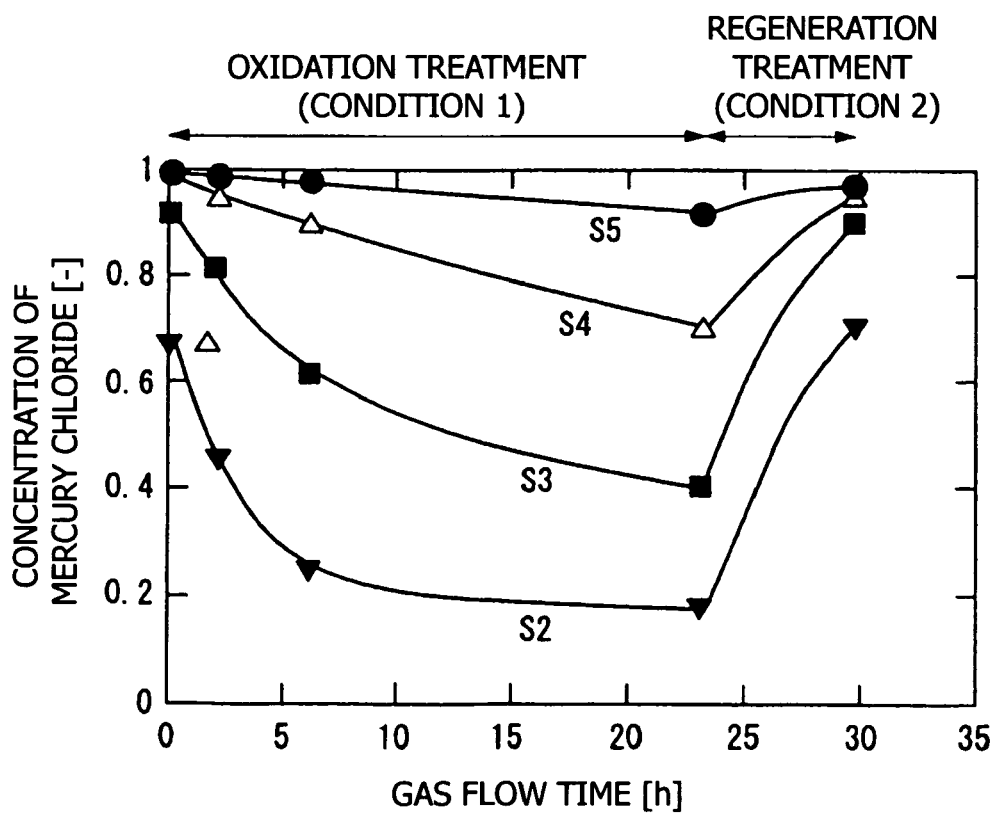
FIG. 11 is a graph showing a result of experiment for verifying the effects of the present invention.
Figure 12:
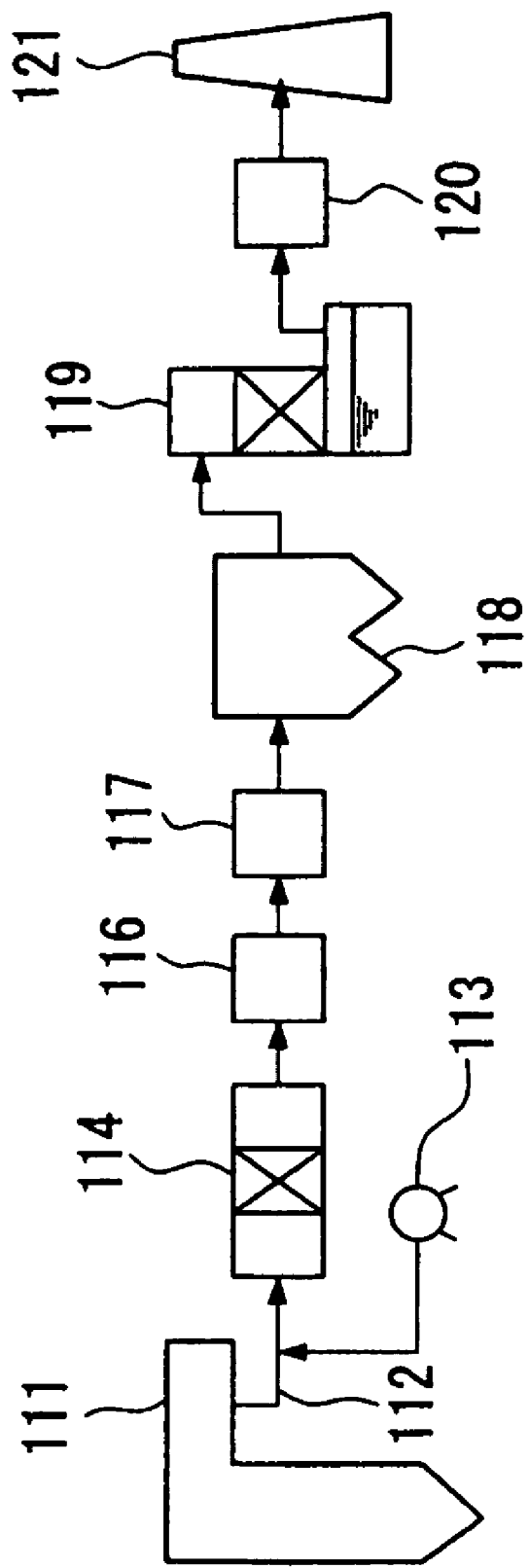
FIG. 12 is a flowchart showing a configuration of a conventional exhaust gas treatment system.
Figure 13:
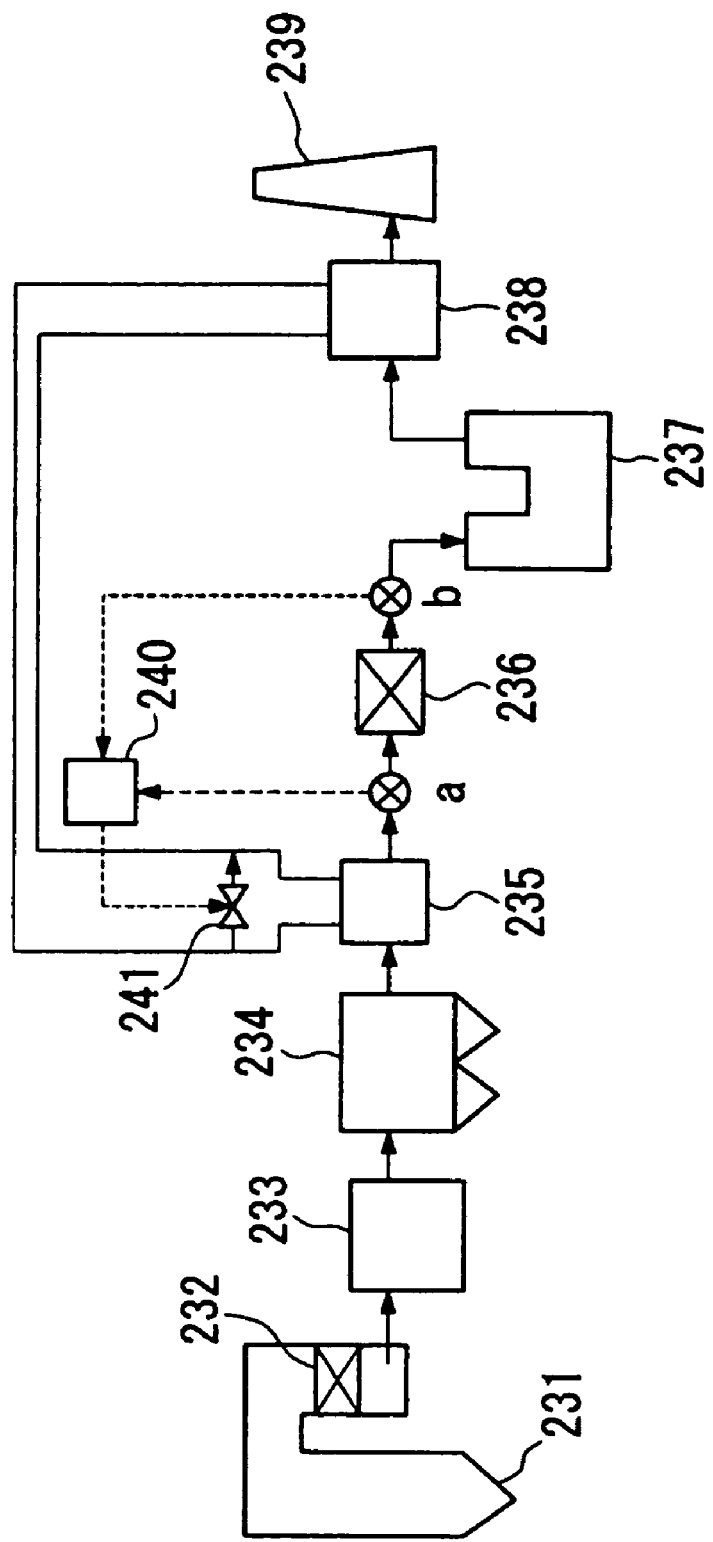
FIG. 13 is a flowchart showing a configuration of an exhaust gas treatment system disclosed in Japanese Patent Provisional Publication No. 2003-53142.

As is apparent from FIG. 11, it is found that the concentration of mercury chloride decreased as the oxidation treatment time had elapsed, which deteriorated the performance of oxidation catalyst. However, the concentration of mercury chloride was restored to the original value in a regeneration treatment time of 6.5 hours while the oxidation treatment time was 23 hours. It was confirmed that by causing a high-temperature regeneration gas to pass through the oxidation catalyst, the oxidation catalyst could be regenerated in a short period of time.

The invention claimed is:

1. An exhaust gas treatment method comprising:
   an oxidizing step for converting metallic mercury contained in combustion exhaust gas into mercury chloride; and
   a removing mercury step from said combustion exhaust gas by dissolving said mercury chloride in water, wherein
   a plurality of oxidation catalysts for performing said oxidizing step are provided, and during the time when said oxidizing step is performed, at least one of said oxidation catalysts performs catalyst performance restoration treatment without performing said oxidation treatment.

2. The exhaust gas treatment method according to claim 1, wherein said catalyst performance restoration treatment is to decompose or remove a compound adhering to said oxidation catalyst.

3. The exhaust gas treatment method according to claim 2, wherein a gas having a temperature not lower than a decomposition temperature of said compound is supplied to said oxidation catalyst.

* * * * *